United States Patent
Hazzard et al.

(10) Patent No.: US 10,431,362 B1
(45) Date of Patent: Oct. 1, 2019

(54) VALVE ACTUATOR WITH ANTI-CORROSION COATING

(71) Applicant: Ademco Inc., Golden Valley, MN (US)

(72) Inventors: Frederick Hazzard, Ham Lake, MN (US); Gregory Young, Blaine, MN (US); Adam Myre, Minnetonka, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 15/980,620

(22) Filed: May 15, 2018

(51) Int. Cl.
| | |
|---|---|
| *F16K 31/06* | (2006.01) |
| *H01F 7/128* | (2006.01) |
| *H01F 27/32* | (2006.01) |
| *C09D 5/08* | (2006.01) |
| *C09D 133/16* | (2006.01) |
| *H01F 7/08* | (2006.01) |

(52) U.S. Cl.
CPC .............. *H01F 7/128* (2013.01); *C09D 5/08* (2013.01); *C09D 133/16* (2013.01); *F16K 31/0658* (2013.01); *F16K 31/0675* (2013.01); *H01F 7/081* (2013.01); *H01F 27/325* (2013.01); *H01F 27/327* (2013.01)

(58) Field of Classification Search
CPC ........ H01F 7/128; H01F 7/081; H01F 27/325; H01F 27/327; F16K 31/0658; F16K 31/0675; C09D 133/16; C09D 5/08
USPC ................ 251/129.15–129.22; 335/282, 299
See application file for complete search history.

(56) References Cited

U.S. PATENT DOCUMENTS

| | | | | |
|---|---|---|---|---|
| 3,377,046 A | * | 4/1968 | Frantz ................ | F16K 31/0627 137/625.65 |
| 3,844,999 A | * | 10/1974 | Petrella ................ | C08F 220/24 524/546 |
| 3,861,644 A | * | 1/1975 | Knape ................ | F16K 31/0665 251/129.14 |
| 4,720,078 A | * | 1/1988 | Nakamura .......... | F16K 31/0606 251/129.01 |
| 4,944,486 A | * | 7/1990 | Babitzka ............ | F02M 51/0614 251/129.21 |
| 5,246,199 A | * | 9/1993 | Numoto ............. | F16K 31/0658 251/129.15 |
| 5,575,309 A | * | 11/1996 | Connell ................ | F16K 31/082 137/554 |

(Continued)

OTHER PUBLICATIONS

"Honeywell Millivolt Operator Assembly for Gas Valve," Honeywell, 1 page, 2017.

(Continued)

*Primary Examiner* — John Bastianelli
(74) *Attorney, Agent, or Firm* — Shumaker & Sieffert, P.A.

(57) ABSTRACT

A gas valve actuator for a gas valve. The gas valve actuator includes a non-conductive support bobbin and an insulated copper wire wound about the support bobbin to form a coil. A magnetic flux concentration member extends through the non-conductive support bobbin. To actuate the gas valve actuator, a current is passed through the coil, which produces a magnetic field that actuates an armature to move a valve seal away from a valve seat of the gas valve. Because the gas valve actuator may be exposed to a gas stream, the coil may be coated with an anti-corrosion coating through a spray or brush process, a potting process, through a dipping process, or in any other suitable manner.

20 Claims, 12 Drawing Sheets

(56) References Cited

U.S. PATENT DOCUMENTS

| | | | | |
|---|---|---|---|---|
| 5,895,026 | A | * | 4/1999 | Linkner, Jr. .......... B60T 8/3615 |
| | | | | 251/129.15 |
| 5,967,487 | A | * | 10/1999 | Cook ................ F02M 25/0836 |
| | | | | 251/129.07 |
| 6,047,718 | A | | 4/2000 | Konsky et al. |
| 7,325,563 | B2 | | 2/2008 | Seko |
| 2008/0237519 | A1 | * | 10/2008 | Sugiyama ............ F02M 51/005 |
| | | | | 251/129.15 |
| 2019/0093787 | A1 | | 3/2019 | Hazzard et al. |

OTHER PUBLICATIONS

"3M Novec 2704 Electronic Grade Coating," 3M, 2 pages, 2016.
"3M Novec 2708 Electronic Grade Coating," 3M, 2 pages, 2016.

* cited by examiner

VALVE ACTUATOR WITH ANTI-CORROSION COATING

TECHNICAL FIELD

The disclosure relates generally to gas valve assemblies, and more particularly, to a valve actuator for use in a gas valve assembly.

BACKGROUND

In recent years the quality of fuel gas has become increasingly poor, particularly in warmer regions where drying the gas is not critical and where regulations do not require relatively high levels of gas purity. As a result, gas supplies have had increasing concentrations of hydrogen sulfide, which can be very corrosive. Solenoid coils used in gas valves in natural gas and propane are highly susceptible to corrosion from hydrogen sulfide, which reacts with copper to form copper sulfide, especially in the presence of moisture. Valve actuators or components thereof (e.g., solenoids, copper wires, connection points) which are located within and/or near a gas stream may degrade or break due to the corrosion. What would be desirable is an economical robust gas valve actuator that is resistant to corrosion due to hydrogen sulfide or other contaminants in a gas supply.

SUMMARY

The disclosure relates generally to gas valve assemblies, and more particularly, to a valve actuator for use in a gas valve assembly. An illustrative, but non-limiting example of the disclosure may be found in a gas valve actuator that includes a non-conductive support bobbin and a magnetic flux concentration member having at least a first arm. The non-conductive support bobbin may include a first flange, a second flange, and an interconnecting segment extending between and generally orthogonal to the first flange and the second flange. The first arm of the magnetic flux concentration member may extend through the interconnecting segment of the non-conductive support bobbin. The valve actuator may further include an insulated copper wire wound around the interconnecting segment of the non-conductive support bobbin, an interconnect terminal electrically coupled to a first end portion of the insulated copper wire, a ground terminal electrically coupled to a second end portion of the insulated copper wire, an anti-corrosion coating disposed over at least the wound insulated copper wire, and an armature that has a valve seal that is configured to aligned with a valve seat of the gas valve. The armature may be actuated by magnetic attraction to the magnetic flux concentration member when a current is applied through the wound insulated copper wire via the interconnect terminal and the ground terminal.

Another example of the disclosure may be found in a valve actuator for use in actuating a gas valve. The valve actuator may include a non-conductive support bobbin with a first flange, a second flange spaced from the first flange, and an interconnecting segment extending between the first flange and the second flange. The non-conductive support bobbin may define a passageway that extends through the first flange, the second flange and the interconnecting segment. The valve actuator may further include a U-shaped magnetic flux concentration member including a first arm extending through the passageway of the non-conductive support bobbin and beyond an end of the passageway, and a second arm extending alongside the non-conductive support bobbin. The valve actuator may further include an insulated copper wire wound around the interconnecting segment of the non-conductive support bobbin, an interconnect terminal electrically coupled to a first end portion of the insulated copper wire, a ground terminal electrically coupled to a second end portion of the insulated copper wire, a ground spring configured for electrically coupling the ground terminal to a conductive housing of the gas valve, a fluoro-acrylate coating disposed over at least the wound insulated copper wire, the interconnect terminal, and the ground terminal, and an armature that has a valve seal that is configured to aligned with a valve seat of the gas valve. The armature may be actuated by magnetic attraction to one or more of the first arm and the second arm of the U-shaped magnetic flux concentration member when a current is applied to the wound insulated copper wire via the interconnect terminal and the ground terminal.

Another example of the disclosure may be found in a method for making a valve actuator for use in actuating a gas valve. The method may include winding an insulated copper wire around a non-conductive support bobbin, with a ground terminal and an interconnect terminal being secured to the non-conductive support bobbin so as not interfere with the winding of the insulated copper wire around the non-conductive support bobbin. A first end portion of the insulated copper wire may be electrically connected to the ground terminal and a second end portion of the insulated copper wire may be connected to the interconnect terminal. The ground terminal and the interconnect terminal may each be bent inward over the wound insulated copper wire and a fluoro-acrylate coating applied to at least the insulated copper wire.

The above summary of some embodiments is not intended to describe each disclosed embodiment or every implementation of the present disclosure. The Figures, and Detailed Description, which follow, more particularly exemplify these embodiments

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
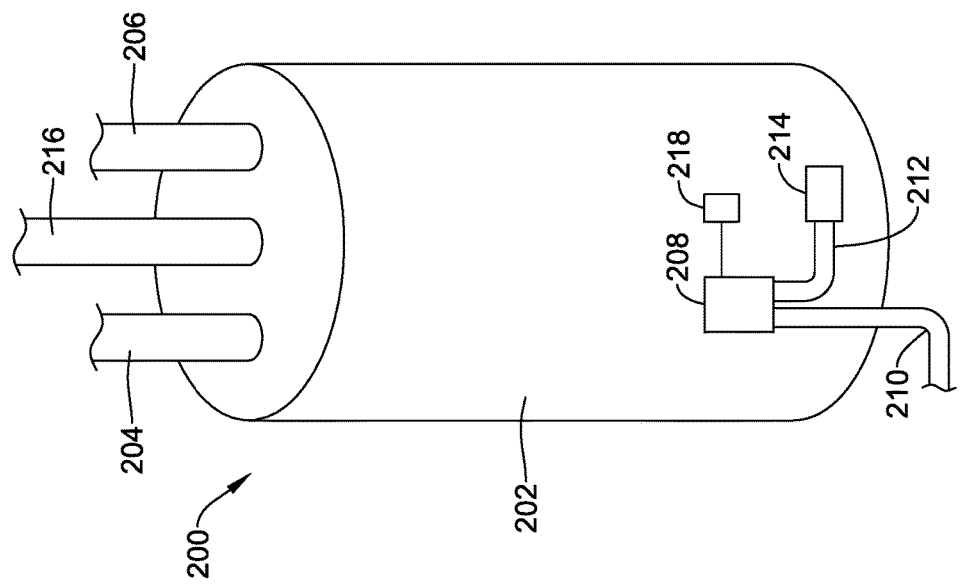
FIG. 1 is a schematic view of an illustrative but non-limiting water heater in accordance with the present disclosure.

While the disclosure is amenable to various modifications and alternative forms, specifics thereof have been shown by way of example in the drawings and will be described in detail. It should be understood, however, that the intention is not to limit the disclosure to the particular illustrative embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

FIG. 1 provides a schematic view of an illustrative but non-limiting water heater 200. While a water heater is described as one example application, it should be recognized that there are many other applications for the gas valves discussed below in subsequent Figures. For example, the gas valves discussed below may be used in other combustion appliance such as furnaces, boilers, gas dryers, and other combustion appliances. The gas valves discussed below may be used in industrial applications, such as in distillation towers and other process applications.

Turning to FIG. 1, the illustrative water heater 200 includes a water heater tank 202. The water heater tank 202 may include an insulating layer (not explicitly shown) positioned about the water heater tank 202 to help reduce thermal losses from the water heater tank 202. Cold water enters water heater tank 202 through a cold water line 204 and is heated by a gas burner 214. In some cases, the water heater 200 may include an electric heating element rather than a gas burner 214. A power delivery unit (not shown) may be used to selectively apply power (i.e. current) to the electric heating element. In either case, the resulting heated water exits through a hot water line 206. For gas-fired water heaters, a gas control unit 208, such as a gas valve, regulates gas flow from a gas source 210 through a combustion gas line 212 and into gas burner 214. A flue 216 permits combustion byproducts to safely exit.

Water heater 200 may include one or more temperature sensors 218. In some cases, a temperature sensor 218 may enter water heater tank 202 at a location laterally and/or vertically offset from gas control unit 208. In some instances, a temperature sensor 218 may instead be located behind gas control unit 208, and in some cases, may be supported and retained by a common mounting bracket. In some embodiments, a non-immersion type temperature sensor may be used.

Figure 2:
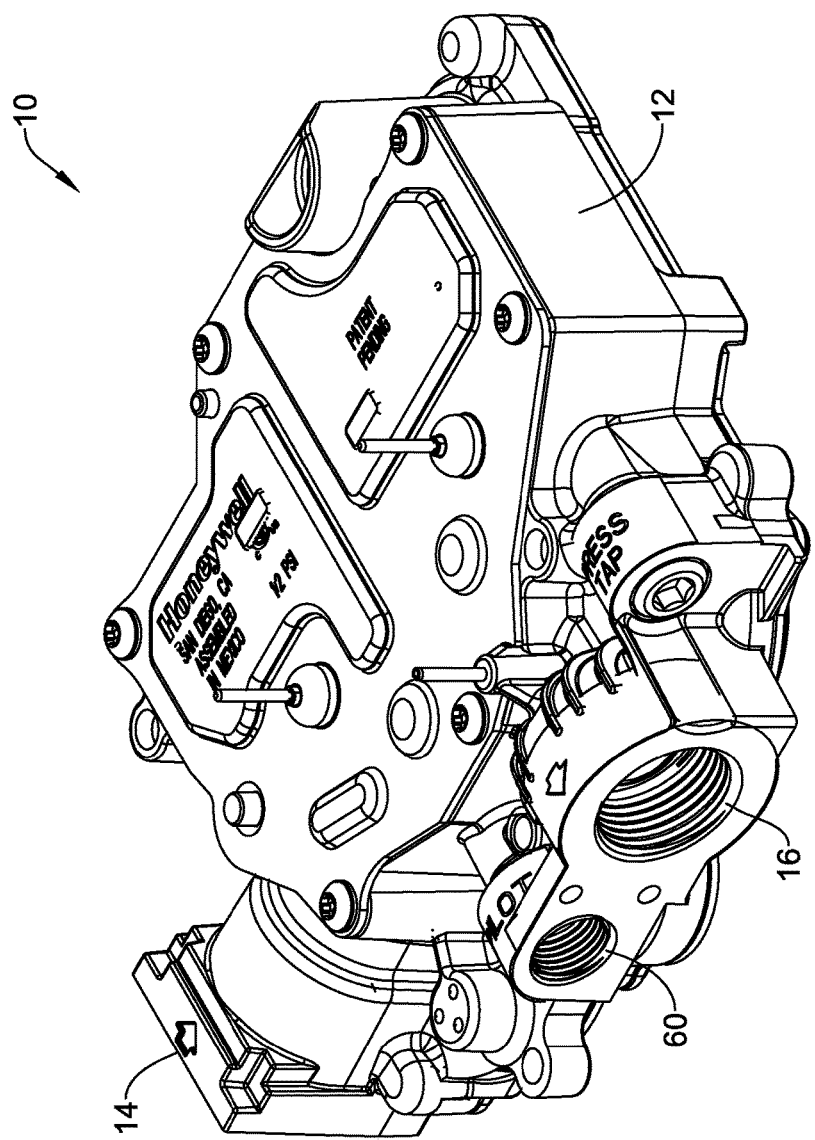
FIG. 2 is a perspective view of an illustrative but non-limiting gas valve in accordance with the present disclosure.

FIG. 2 is a perspective view of an illustrative, but non-limiting gas valve 10. The illustrative gas valve 10 includes a valve body 12 that has a gas inlet 14, a gas outlet 16, and a conduit (see, for example, FIGS. 3 and 4) connecting the gas inlet 14 to the gas outlet 16. The valve body 12 may be a single piece molded or cast structure sometimes with a removable cover, although this is not required.

Figure 3:
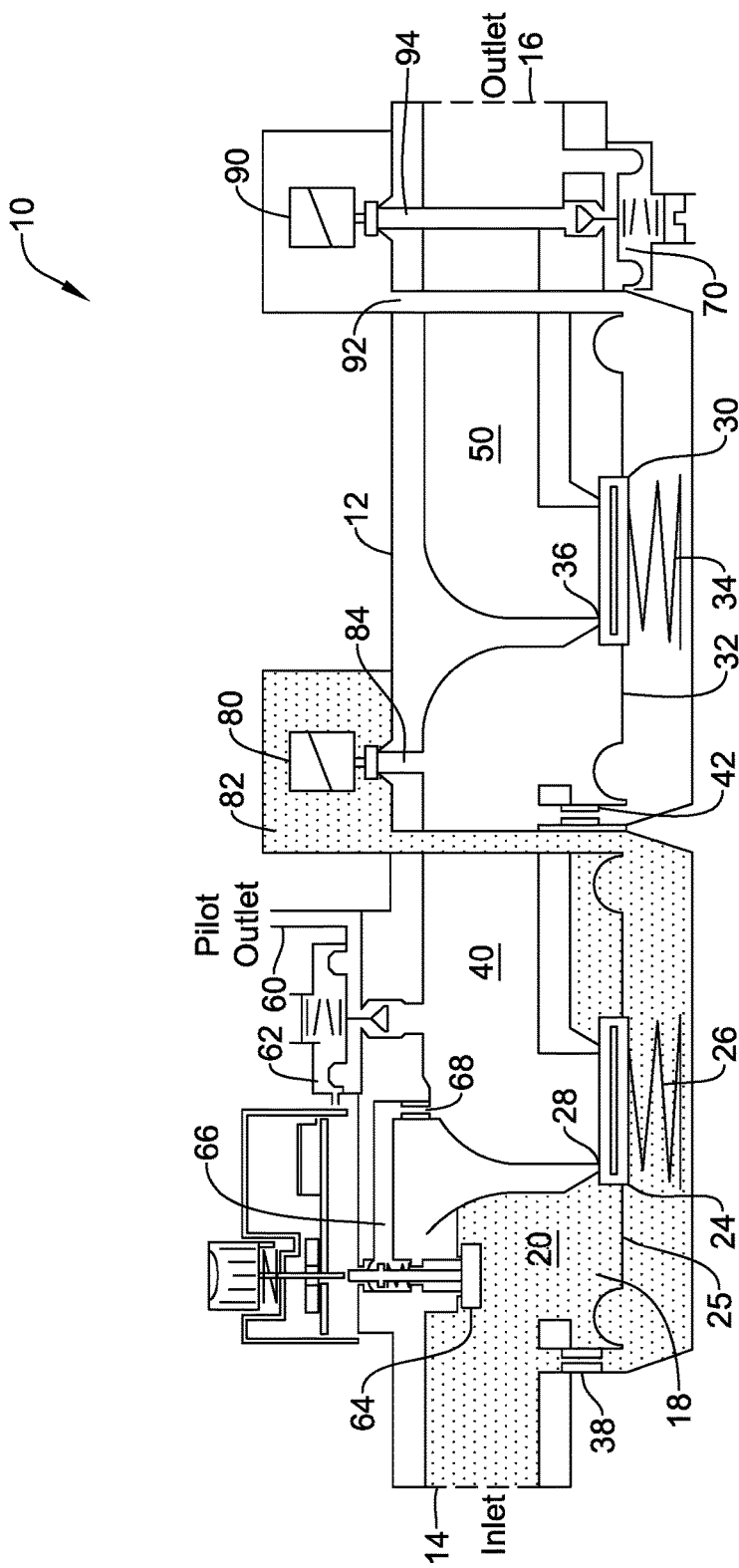
FIG. 3 is a schematic cross-sectional view of the illustrative gas valve of FIG. 1 in an off position.

FIG. 3 is a schematic cross-sectional view of the illustrative, but non-limiting gas valve 10 of FIG. 2 in a closed or off configuration. The illustrative gas valve 10 includes a valve body 12 that has a gas inlet 14, a gas outlet 16, and a conduit 18 connecting the gas inlet 14 and the gas outlet 16. In the illustrative embodiment shown, the conduit 18 includes a first flow chamber 20, a second flow chamber 40, and a third flow chamber 50. However, it is contemplated that the gas valve 10 may include fewer than or more than three flow chambers, as desired. The first flow chamber 20 may be in fluid communication with the gas inlet 14. The third flow chamber 50 may be in fluid communication with the gas outlet 16. The gas outlet 16 may be configured to connect to a gas burner of a water heater or other combustion appliance via a coupling (not explicitly shown). The gas valve 10 may further include a pilot burner outlet 60. In some embodiments, a pilot pressure regulator 62 may regulate the pressure at the pilot burner outlet 60. A main pressure regulator 70 may regulate the pressure at the main burner outlet 16.

To control the flow of gas through the flow chambers 20, 40, 50, the gas valve 10 may include a pilot gas valve, such as a manual pilot valve 64, a first valve 24, and a second valve 30. These valves may be used to control the flow of the gas to various components of the gas valve 10. In an illustrative embodiment, the manual pilot valve 64 might open and close to control gas flow from the first flow chamber 20 to an automatic pilot valve bypass 66. The automatic pilot valve bypass 66 might bypass the first valve 24 and connect the first flow chamber 20 to the second flow chamber 40 and, hence, to the pilot burner outlet 60. Flow through the automatic pilot valve bypass 66 can be limited by a pilot flow limiting orifice 68.

The first valve 24 can open and close to control gas flow from the first flow chamber 20 to the second flow chamber 40. The first valve 24 may include, for example, a diaphragm valve, although other types of valves can be used. In the case of a diaphragm valve as shown, the first valve 24 may include a first valve diaphragm 25 and a resilient spring 26. The resilient spring 26 biases the first valve 24 towards a first valve seat 28, causing the first valve 24 to be a normally closed valve.

The second valve 30 can open and close to control gas flow from the second chamber 40 to the third chamber 50. The second valve 30 may include, for example, a diaphragm valve, although other valve types may be used. In the case of a diaphragm valve as shown, the second valve 30 may include a second valve diaphragm 32 and a resilient spring 34. The resilient spring 34 may bias the second valve 30 towards a second valve seat 36 and cause the second valve 30 to be a normally closed valve.

The first valve 24 can open and close to control gas flow from the first flow chamber 20 to the second flow chamber 40. In some cases, the first valve 24 may be controlled by a first electronic valve actuator or millivolt (mV) operator 80. The first electronic valve actuator 80 may control one or more pneumatic pressure paths that cause the first valve 24 to move away from the first valve seat 28 and to the open position. The underside of the first valve 24 may be in fluid communication with the gas inlet 14 through supply orifice 38. The pressure of the gas underneath the first valve 24 may help (e.g., in combination with resilient spring 26) maintain the first valve 24 sealed against the first valve seat 28 when the gas valve 10 is off and no gas flow is desired. As can be seen in FIG. 2, when no gas flow is desired, the gas is confined to the first flow chamber 20.

The first electronic valve actuator 80 can open and close to control gas flow from an electronic valve actuator supply 82 to the second flow chamber 40. By opening the first electronic valve actuator 80, gas can flow from the underside of the first valve diaphragm 25 towards the second flow chamber 40. This gas flow, in turn, can also act to release gas pressure from the underside of the first valve diaphragm 25. The supply orifice 38 can be sized to limit gas flow to and regulate re-pressurization of the underside of the diaphragm 25. As more gas fills the second flow chamber 40, the pressure above the diaphragm 25 (e.g., in the second flow chamber 40) overcomes the biasing force of the resilient spring 26 and the pressure under the diaphragm 25, and the first valve 24 opens.

The second valve 30 can open and close to control gas flow from the second flow chamber 40 to the third flow chamber 50, and thus to the gas burner (not explicitly shown). In some cases, the second valve 30 may be controlled by a second electronic valve actuator or millivolt (mV) operator 90. The electronic valve actuator 90 may control one or more pneumatic pressure paths that cause the second valve 30 to move away from the second valve seat 36 and to the open position. The underside of the second valve 30 may be in fluid communication with the second flow chamber 40. The pressure of the gas underneath the second valve 30 may help (e.g., in combination with resilient spring 34) maintain the second valve 30 sealed against the second valve seat 36 when the gas valve 10 is off and no gas flow is desired. As can be seen in FIG. 3, when no gas flow is desired, the gas is confined to the first flow chamber 20. While not explicitly shown, in some cases gas may be confined to both the first flow chamber 20 and the second flow chamber 40 when no gas flow as desired.

The second electronic valve actuator 90 can open and close to control gas flow from an electronic valve actuator supply 92 to the third flow chamber 50. By opening the second electronic valve actuator 90, gas can flow from the underside of the second valve diaphragm 32 towards the third flow chamber 50. This gas flow, in turn, can also act to release gas pressure from the underside of the second valve diaphragm 32. The supply orifice 42 can be sized to limit gas flow to and regulate re-pressurization of the underside of the diaphragm 32. As more gas fills the third flow chamber 50, the pressure above the diaphragm 32 (e.g., in the third flow chamber 50) overcomes the biasing force of the resilient spring 34 and the pressure under the diaphragm 32, and the second valve 30 opens.

The electronic valve actuators 80, 90 may be electronically coupled to a controller and/or power source. In some cases, a thermopile that is exposed to the pilot and/or main burner flame may be used to supply energy to a controller and/or the electronic valve actuators 80, 90. Alternatively, or additionally, the power source may be an external power source such as, but not limited to line voltage or 24 Volt AC. When gas flow is desired (e.g., heat to the water heater of FIG. 1 is called for), a controller may actuate the first electronic valve actuator 80 to cause the first electronic valve actuator 80 to open. Once the first electronic valve actuator 80 is open, gas may begin to flow into the second flow chamber 40 through a now open channel 84. A restrictor may be provided in one or more channels to reduce the flow of gas in a particular flow direction. As the gas begins to flow into the second flow chamber 40, the pressure on top of the first valve 24 may become greater than the pressure underneath the first valve 24. Once the pressure on top of the first valve 24 increases above the combined force provided by the resilient spring 26 and the pressure underneath the first valve 24, the first valve 24 will move away from the first valve seat 28 under a pneumatic pressure, and allow for a flow of gas from the first flow chamber 20 to the second flow chamber 40.

It is contemplated that the second electronic valve actuator 90 may be actuated substantially simultaneously with or after the first electronic valve actuator 80. Is contemplated that the controller may actuate the second electronic valve actuator 90 to cause the second electronic valve actuator 90 to open. Once the second electronic valve actuator 90 is open, gas may begin to flow into the third flow chamber 50 through a now open channel 94. A restrictor may be provided in one or more channels to reduce the flow of gas in a particular flow direction. As the gas begins to flow into the third flow chamber to 50, the pressure on top of the second valve 30 may become greater than the pressure underneath the second valve 30. Once the pressure on top of the second valve 30 increases above the combined force provided by the resilient spring 34 and the pressure underneath the second valve 30, the second valve 30 will move away from the second valve seat 36 under a pneumatic pressure, and allow for a flow of gas from the second flow chamber 40 to the third flow chamber 50.

The gas valve assembly 10 of FIGS. 2 and 3 may include a first blocking valve 24 and a second blocking valve 30 to create a redundant gas valve. It is contemplated that other valve configurations including a single blocking valve may be used with only one valve actuator 80. Without limitation, some other valve configurations are described in commonly assigned U.S. patent application Ser. No. 15/717,608 filed on Sep. 27, 2017 and entitled "WATER HEATER GAS VALVE," the disclosure of which is hereby incorporated by reference.

In some cases, and as shown in FIG. 3, the first and second electronic valve actuators 80, 90 may be situated in the gas stream. As the quality of fuel gas decreases, gas supplies may include increasing concentrations of hydrogen sulfide. Some components within the electronic valve actuators 80, 90 may be highly susceptible to corrosion from hydrogen sulfide gas, which reacts with copper to form copper sulfide, especially in the presence of moisture. In such cases, it would be highly desirable to reduce the susceptibility of the electronic valve actuators 80, 90 to such corrosion.

Figure 4:
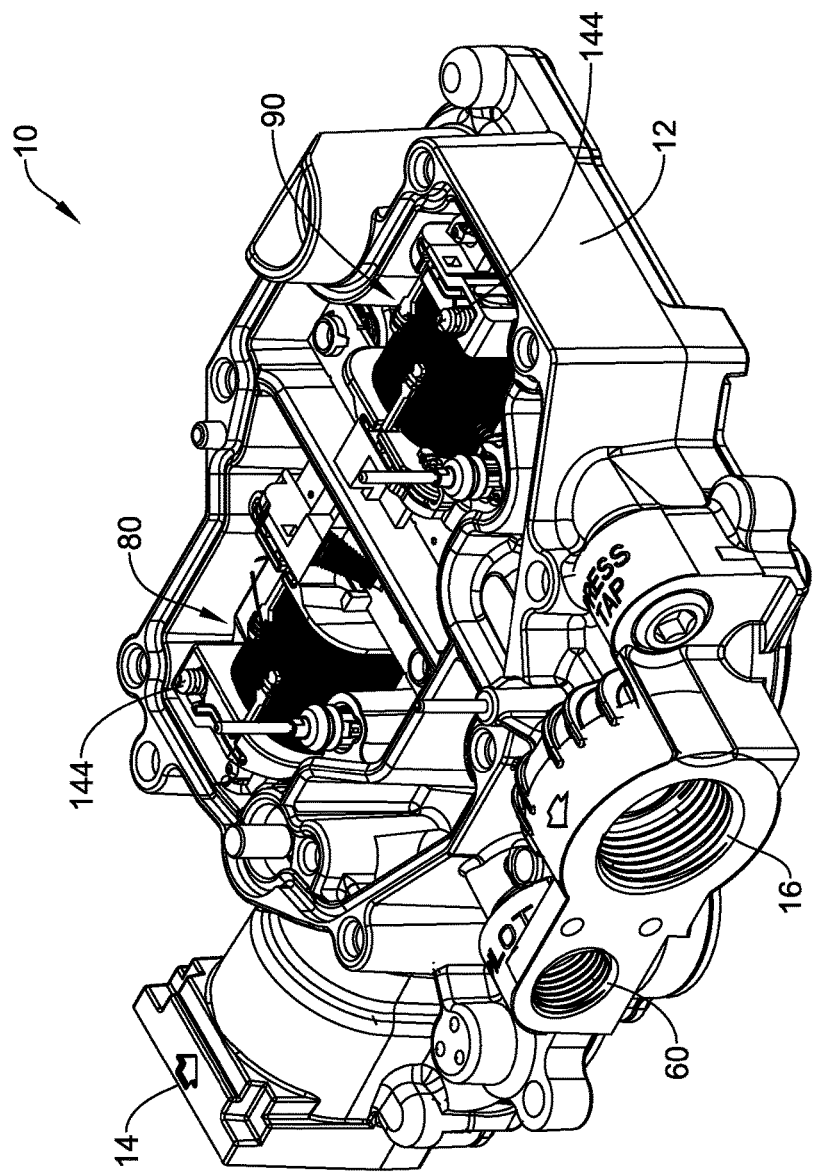
FIG. 4 is another perspective view of the illustrative gas valve of FIG. 2 but with the cover removed.

FIG. 4 illustrates another perspective view of the illustrative gas valve assembly 10 of FIG. 2 with a cover of the valve body 12 removed to illustrate the first and second electronic valve actuators 80, 90 positioned within the valve body 12. The first and second electronic valve actuators 80, 90 of FIGS. 2-3 may be similar in form and function. The structure of the first and second electronic valve actuators 80, 90 are further described with respect to FIGS. 5-12 as a generic valve actuator 100.

Figure 5:
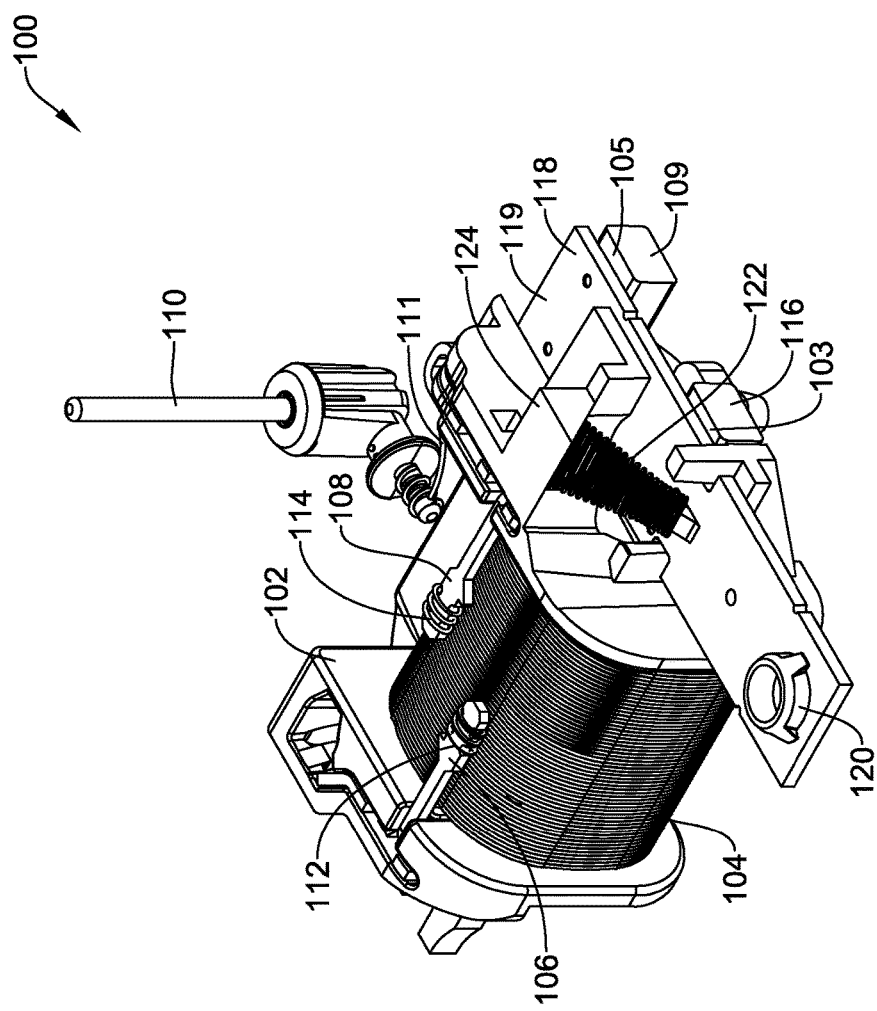
FIG. 5 is a front perspective view of an illustrative valve actuator.
Figure 6:
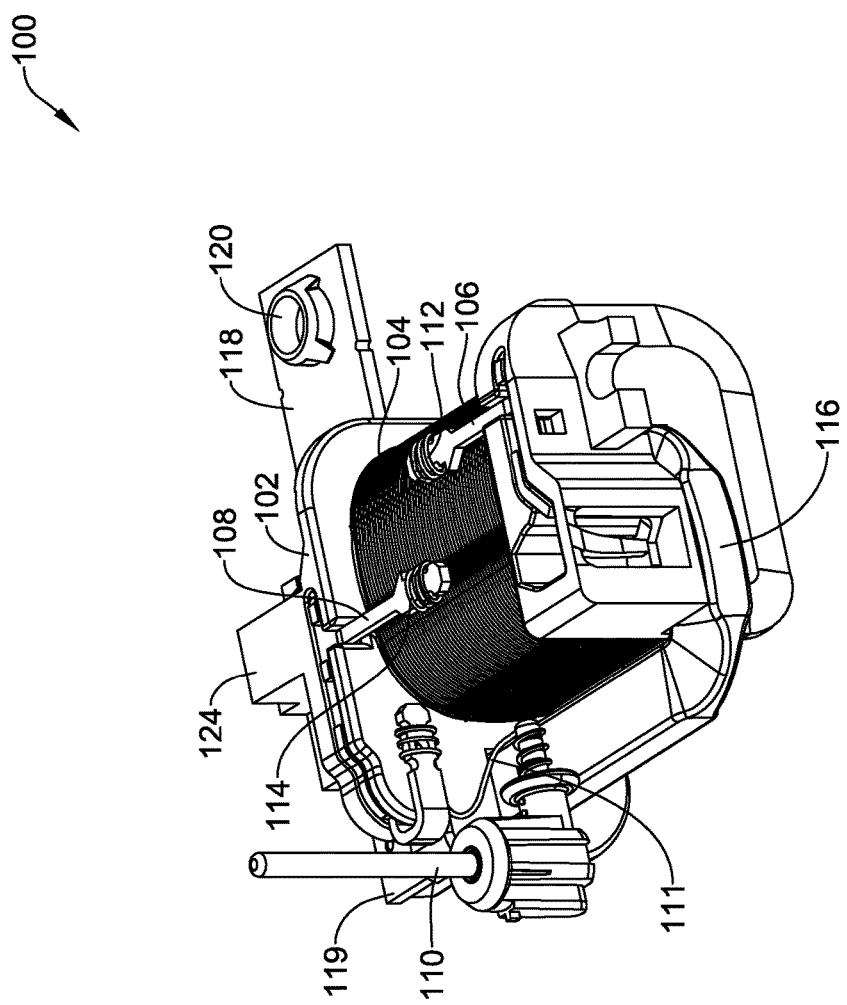
FIG. 6 is a rear perspective view of the illustrative valve actuator of FIG. 5.

FIG. 5 illustrates a front perspective view of an illustrative electronic valve actuator 100, and FIG. 6 illustrates a rear perspective view of the illustrative electronic valve actuator 100. The illustrative electronic valve actuator 100 includes a non-conductive support member or bobbin 102. A conductive wire 104 may be wound around at least a portion of the support bobbin 102 to form a magnetic coil. A first end portion 114 of the conductive wire 104 may be electrically coupled to an interconnect terminal 108, and a second end portion 112 of the conductive wire 104 may be electrically coupled with the ground terminal 106. In some instances, the conductive wire 104 may be an insulated copper wire. However, other conductive materials, such as, but not limited to, nickel or aluminum, may be used to form the conductive wire 104, as desired. The conductive wire 104 may have a length wound about the support bobbin 102. The length may be selected to generate a predetermined magnetic field when current flows through the conductive wire 104. The interconnect terminal 108 may be electrically coupled to an interconnect pin 110, sometimes using a non-copper wire 111 (such as, but not limited to, a nickel wire). While not explicitly shown, the interconnect pin 110 may be configured to be electrically connected to a power source, controller, or other mechanism for selectively supplying current to the conductive wire to control the open/close position of the valve actuator 100.

The illustrative electronic valve actuator 100 may further include a magnetic flux concentration member 116. The magnetic flux concentration member 116 may be, for example, a soft ferromagnetic (or ferrimagnetic) material, such as iron. As will be described in more detail herein, at least a portion of the magnetic flux concentration member 116 may extend through portion of the support bobbin 102. In some cases, an armature 118 may be positioned along a lateral side of the support bobbin 102. The armature 118 may be movable between a first position and a second position to maintain a valve seal 120 in a closed configuration or an open configuration, as desired. A spring 122, or other biasing mechanism, may extend between the armature 118 and a laterally extending portion 124 of the support bobbin 102. In the example shown, the spring 122 may exert a bias force on the armature 118 to bias the valve seal 120 into a normally closed configuration. When the armature 118 is in the closed configuration, the valve seal 120 may contact a valve seat of the valve body 12 and prevent a flow of gas therethrough.

As an electrical current is passed through the conductive wire 104 (provided via the interconnect pin 110), a magnetic field is generated and collected by the magnetic flux concentration member 116. A magnetic attraction between the armature 118 and the magnetic flux concentration member 116 may be used to move the armature 118 from the normally closed configuration is illustrated in FIG. 5 to an open configuration. In the example shown, a first end 119 of armature 118 may be attracted to and come into contact with the magnetic flux concentration member 116 and 109. This magnetic attraction may cause the armature 118 to overcome the biasing force of the spring 122 and move such that the valve seal 120 is lifted upward in FIG. 5 and away from a valve seat (not shown), allowing a flow of gas to pass by the valve seat of the valve body 12. It is contemplated that when the armature 118 is in a closed configuration, the first end 119 of armature 118 may contact an underside of the first laterally extending portion 124 and when the armature is in an open configuration the first end 119 of armature 118 may be spaced a distance from the underside of the first laterally extending portion 124.

Figure 7:
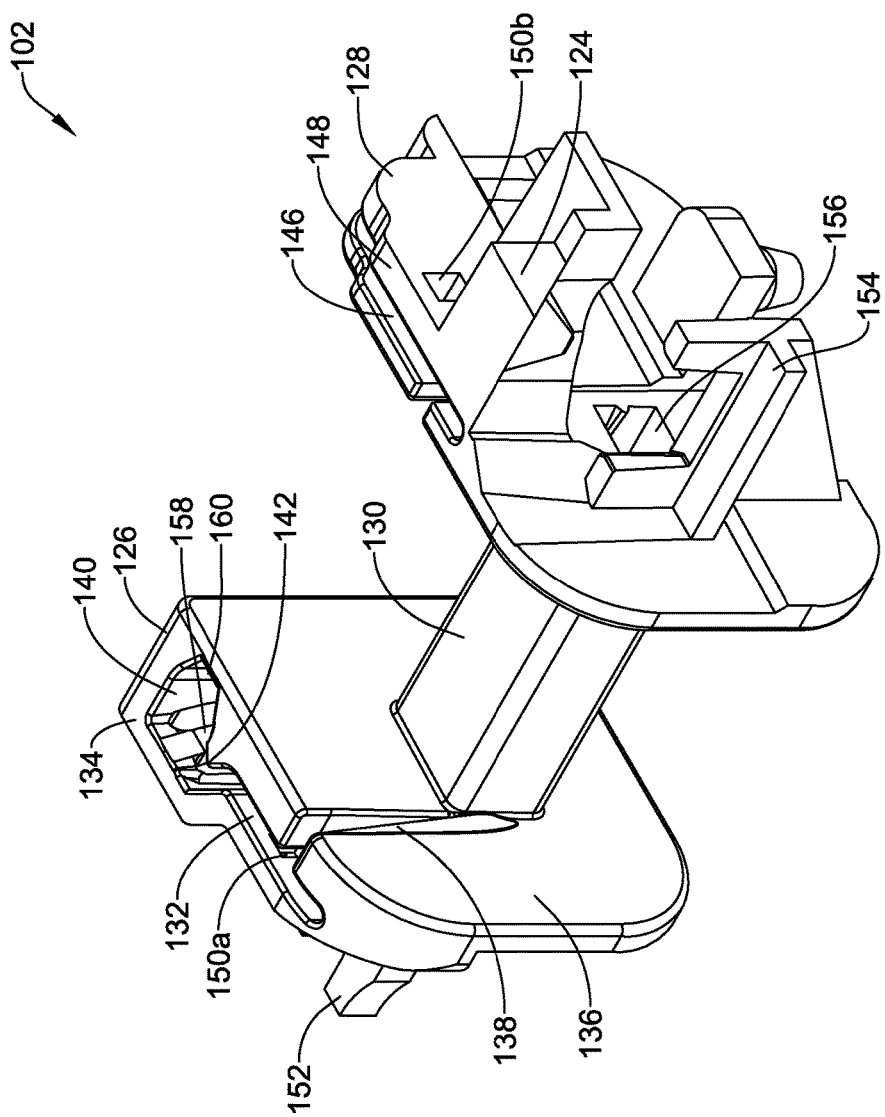
FIG. 7 is a perspective view of an illustrative support bobbin.
Figure 8:
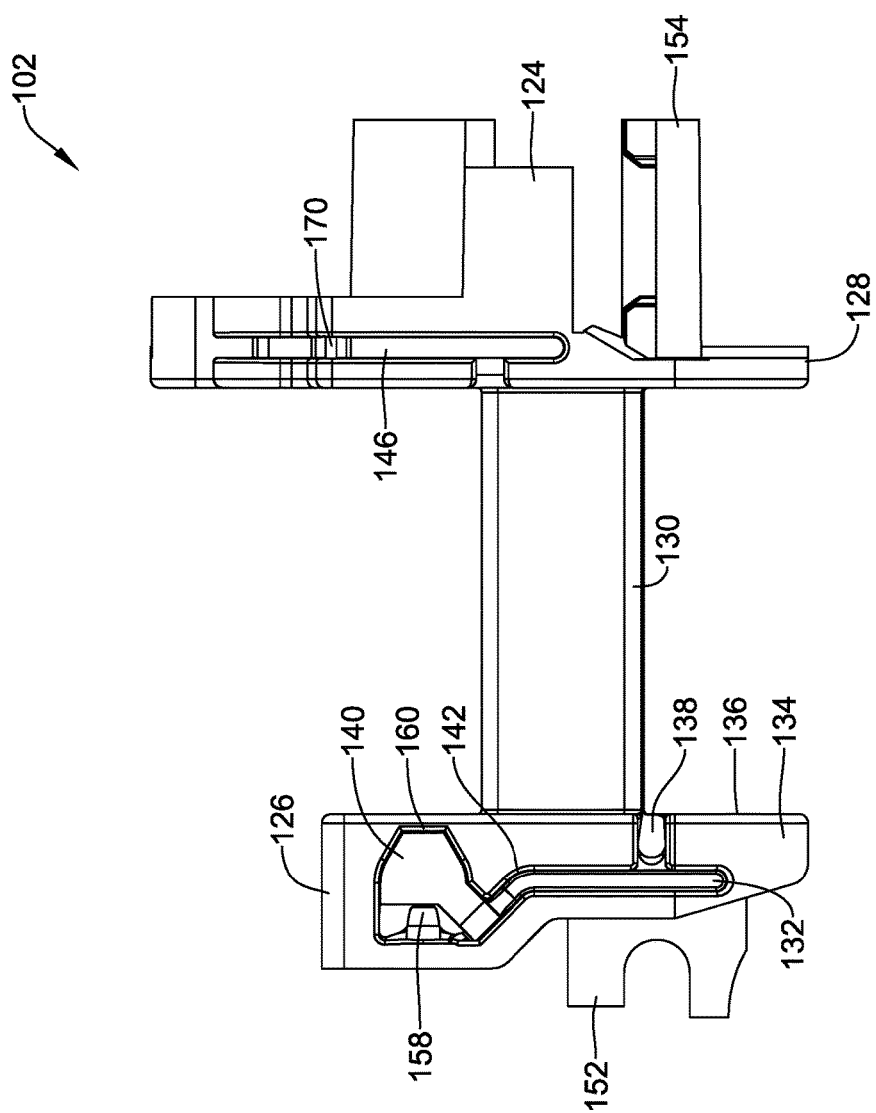
FIG. 8 is a top view of the illustrative support bobbin to FIG. 7.

Referring now to FIG. 7, which illustrates a front perspective view of the illustrative non-conductive support bobbin 102 of FIGS. 5-6, and FIG. 8 which illustrates a top view of the illustrative support bobbin 102. As seen in FIG. 7, the illustrative support bobbin 102 may include a first flange 126, a second flange 128 spaced from the first flange 126, and an interconnecting segment 130 extending between and generally orthogonal to the first flange 126 and the second flange 128. It is contemplated that the first and second flanges 126, 128 may have a thickness and be formed from a material sufficient to prevent flexing during winding of the conductive wire 104 on the interconnecting segment 130. This may help prevent flexing of the flanges 126, 128 during winding which may result in an interference between the bobbin support 102 and the valve body 12. For example, if the bobbin support 102 were to flex or otherwise deform during assembly, alignment issues with for example the valve seal 120, may be created.

Figure 9:
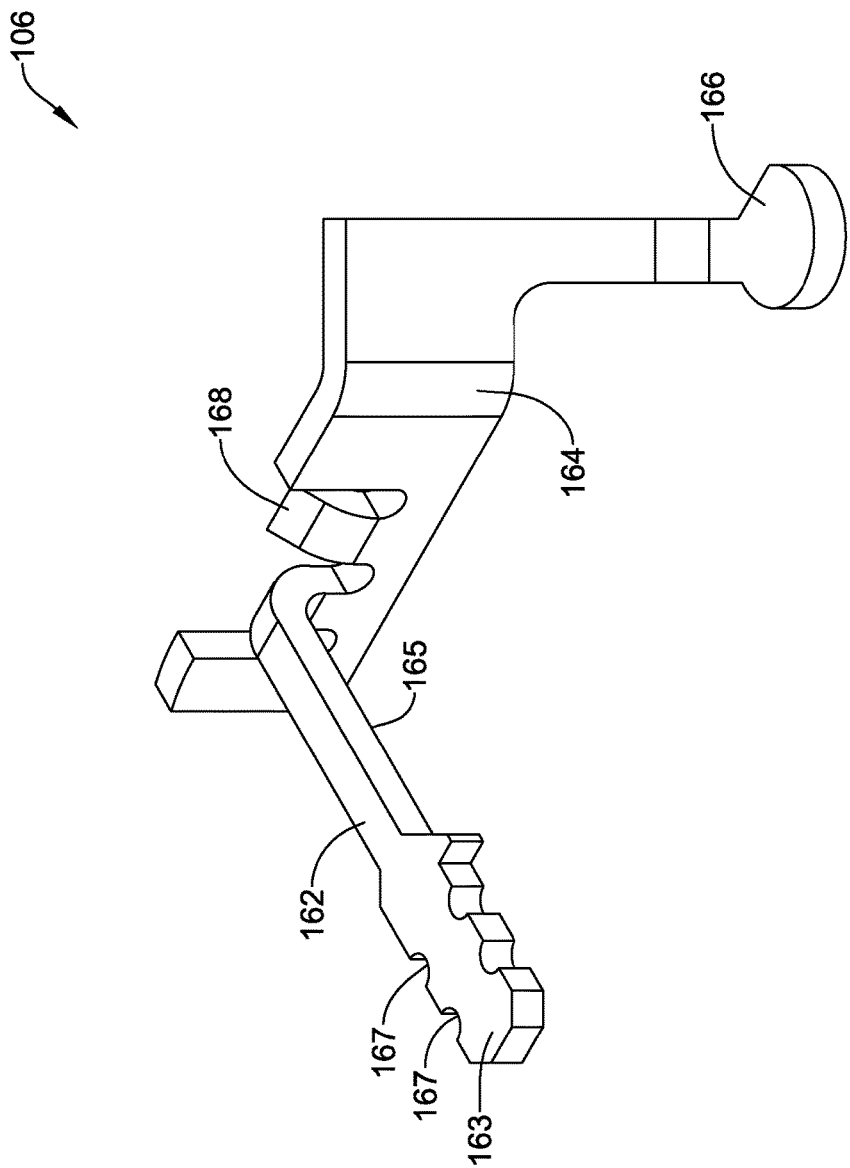
FIG. 9 is a perspective view of an illustrative ground terminal.

The first flange 126 may include a first slot 132 extending from a top surface 134 of the first flange 126 towards the bottom surface thereof. The first slot 132 may be configured to receive at least a portion of the ground terminal 106 therein (see FIG. 9). In some embodiments, the first slot 132 may include alignment features, such as but not limited to, a bend or curve 142 configured to maintain proper alignment of the ground terminal 106 within the slot 132. Referring additionally to FIG. 9, which illustrates a perspective view of an illustrative ground terminal 106, the ground terminal 106 may include a bend or curve 164 configured to align with the curve in the first slot 132. It is contemplated that other alignment features may be used, as desired, to align the ground terminal 106 within the first slot 132.

The first slot 132 may further include an enlarged region or pocket 140 configured to receive a connection element, such as, but not limited to, a ground spring 144 (see, for example, FIG. 4) configured to provide an electrical connection between the ground terminal 106 and the valve body 12. In some instances, the ground terminal 106 may have a pad 166 (see, for example, FIG. 9) positioned at a bottom of the enlarged region 140 to make the electrical connection from the ground terminal 106 to the ground spring 144. It is contemplated that the non-conductive support bobbin 102 may be positioned between the ground terminal 106 and the magnetic flux concentration member 116 such that the ground terminal 106 cannot short to the magnetic flux concentration member 116 (and thus create a second ground path that may be unreliable and create a false pass scenario in production testing of the ground connection).

It is further contemplated that the enlarged region 140 may include a biasing element such as, but not limited to, a finger-like plastic spring 158 (see, also, FIG. 12) configured to bias the ground spring 144 towards an alignment feature 160 such as, but not limited to, a V-block feature molded within the enlarged region 140. In some instances, the alignment feature 160 may help ensure precise positioning of the ground spring 144, which may be beneficial to locating the ground spring 144 at a particular location within the valve body 12. It is further contemplated that the biasing element 158 may have a specific profile that allows it to be flexible enough to accommodate a range of ground spring 144 sizes and pocket 140 size tolerances that occur during manufacture, while not putting much radial force on the ground spring 144 that it interferes with proper compression of the ground spring 144. The biasing element 158 may help prevent the ground spring 144 from being loose within the pocket 140 which may reducing shifting of the ground spring 144 during assembly of the valve body 12 and may also prevent the ground spring 144 from falling out of the pocket 140 during assembly.

Figure 10:
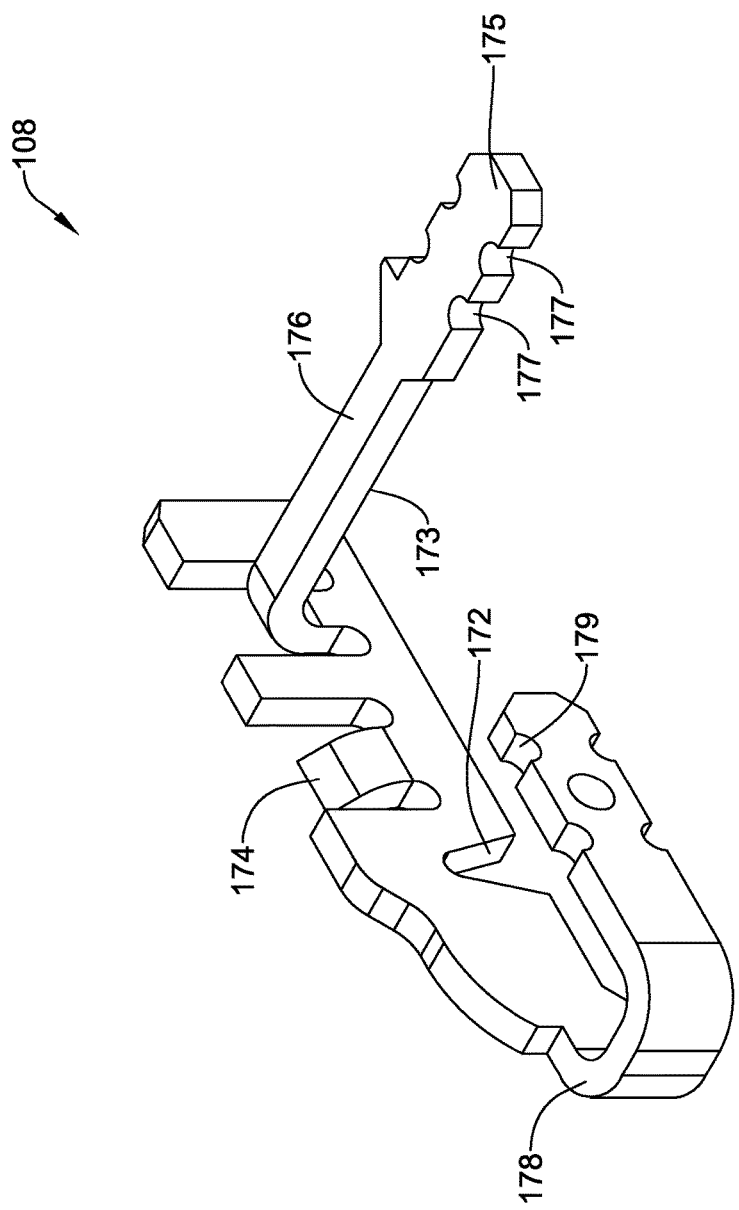
FIG. 10 is a perspective view of an illustrative interconnect terminal.

The second flange 128 may include a second slot 146 extending from a top surface 148 of the second flange 128 toward the bottom surface thereof. The second slot 146 may be configured to receive at least a portion of the interconnect terminal 108 therein (see FIG. 10). In some embodiments the second slot 146 may include alignment features, such as, but not limited to, a keying feature 170 (see, for example, FIG. 8), to align the interconnect terminal 108 within the second slot 146. Referring additionally to FIG. 10, which illustrates a perspective view of an illustrative interconnect terminal 108, in some instances the keying feature may include a protrusion 170 configured to mate with a notch 172 in the interconnect terminal 108.

The first flange 126 may further include an additional slot 138 extending along and through a portion of a lateral side surface 136 of the first flange 126. As will be described in more detail herein, the second slot 138 may allow the conductive wire 104 to be led into the center of the non-conductive bobbin 102 which may help prevent direct contact between the start of the winding and the end of the winding portions (e.g., the first end portion 114 and the second end portion 112 of the conductive wire 104).

The first and second flanges 126, 128 may each include an aperture 150a, 150b (collectively, 150) configured to receive a locking tab 168, 174 (see, for example, FIGS. 9 and 10) on the ground terminal 106 or the interconnect terminal 108, respectively. The locking tabs 168, 174 and corresponding apertures 150 may cooperate to form a snap locking feature to retain the terminals 106, 108 within the corresponding slots 132, 146 by way of a mechanical engagement of the locking tab 168, 174 and the corresponding apertures 150. For example, the locking tab 168 on the ground terminal 106 and/or the locking tab 174 on the interconnect terminal 108 may be deflectable such that the tabs 168, 174 are biased for assembly of the terminals 106, 108 into the slots 132, 146 and return to their original configuration once aligned with the corresponding aperture 150.

The first flange 126 may further include a laterally extending alignment feature 152 (see FIG. 8). The alignment feature 152 may extend away from the interconnecting segment 130 and may be configured to align and mate with a corresponding feature in the valve body 12. The alignment feature 152 may help retain the valve actuator 100 in a desired position within the valve body 12. The second flange 128 may include a first laterally extending portion 124 and a second laterally extending portion 154, each extending in a direction away from the interconnecting segment 130. The second laterally extending portion 154 may be configured to receive a portion of the armature 118 and to provide a pivot point for the armature 118. In some instances, the second laterally extending portion 154 may be configured to mate with corresponding features on the armature to align the armature 118 as well as to minimize axial movement of the armature 118. In addition to providing a mechanical stop for the biasing spring 122, the first laterally extending portion 124 may also create a mechanical stop for a second end of the armature 118 as will be described in more detail herein.

The non-conductive support bobbin 102 may include a passageway 156 extending from the first flange 126 through the interconnecting segment 130 and to the second flange 128 (see FIG. 7). The passageway 156 may extend through an entirety of the width of the first flange 126 and an entirety of the width of the second flange 128. The passageway 156 may be configured to receive at least a portion of the magnetic flux concentration member 116.

FIG. 9 illustrates a perspective view of an illustrative ground terminal 106. The ground terminal 106 may be a tin-nickel (tin over nickel flash) plated brass electrical terminal. However, it is contemplated that the ground terminal 106 may be formed from different materials, as desired. In some examples, the ground terminal 106 may be formed from aluminum or nickel. In yet another example, the ground terminal 106 may be a brass electrical terminal with either nickel electroplating or electroless nickel plating. It is contemplated that the ground terminal 106 may be formed by stamping and subsequently bending to form the ground terminal 106 into its final shape. In some instances, the ground terminal 106 may be plated prior to stamping. After the support bobbin 102 is wound and the conductive wire 104 is soldered to (or otherwise coupled) to the termainls 106, 108, all or a portion of the ground terminal 106, solder, and conductive wire 104 under the solder may be protected from corrosion by covering it (or potions thereof) with an ultraviolet (UV) cured adhesive, Chemglaze® polyurethane (manufactured by the Lord Corporation, Erie, Pa.), fluoro-acrylate, or a similar coating that is not permeable to hydrogen sulfide.

The ground terminal 106 may include a bendable or deformable arm 162 that is configured to be electrically coupled to the second end portion 112 of the insulated copper wire 104. It is contemplated that the arm 162 may be positioned generally orthogonal to the longitudinal axis of the support bobbin 102 (e.g., generally orthogonal to the interconnecting segment 130 or generally parallel to the first flange 126) when the ground terminal 106 is snap fit within the slots 132 of the first flange 126. In other words, to assemble the ground terminal 106 within the support bobbin 102, the arm 162 may be positioned generally parallel to the first flange 126. The ground terminal 106 may be positioned within the first slot 132 until the locking tab 168 to engages the aperture 150a. In some instances, the arm 162 may be bent beyond perpendicular in a direction away from the interconnecting segment 130 to ensure the conductive wire 104 does not catch on the ground terminal 106 during winding of the conductive wire 104 on the interconnecting segment 130. It is contemplated that the arm 162 may remain in this configuration while the conductive wire 104 is connected to the arm 162.

The second end portion 112 of the insulated copper wire 104 may be wound about and/or soldered to (or otherwise electrically coupled with) an end region 163 of the arm 162. In some instances, the end region 163 may include one or more features 167 configured to direct or position the conductive wire 104 around the arm 162. These features 167 may help ensure the second end portion 112 of the conductive wire 104 is located optimally for termination (e.g., placement of the second end portion 112 of the conductive wire 104) and folding down of the arm 162 over the resulting coil after the conductive wire 104 has been wound. The conductive wire 104 may be directed along an underside surface 165 of the arm 162 and down through the additional slot 138 in the first flange 126 and towards the interconnecting segment 130. As described above, directing the conductive wire 104 through the slot 138 may lead the conductive wire 104 to the center (e.g., the interconnecting segment 130) of the bobbin support 102, which may prevent direct contact between the second end portion 112 and the first end portion 114 of the conductive wire 104. The conductive wire 104 may then be wound about the interconnecting segment 130 until a desired length of conductive wire 104 is disposed about the interconnecting segment 130 to produce a desired magnetic field during operation. The first end portion 114 of the conductive wire 104 may be coupled to the interconnect terminal 108. Once the winding is complete, the arm 162 may be bent inward over the winding (as shown in FIGS. 4-6) such that it extends generally parallel to the longitudinal axis of the support bobbin 102 and towards the second flange 128. In some cases, bending of the arm 162 may not be required or the arm 162 may be bent in a direction other than inward.

FIG. 10 illustrates a perspective view of an illustrative interconnect terminal 108. The interconnect terminal 108 may be a tin-nickel (tin over nickel flash) plated brass electrical terminal. However, it is contemplated that the interconnect terminal 108 may be formed from different materials, as desired. In some examples, the interconnect terminal 108 may be formed from aluminum or nickel. In yet another example, the interconnect terminal 108 may be a brass electrical terminal with either nickel electroplating or electroless nickel plating. It is contemplated that the interconnect terminal 108 may be formed by stamping and subsequent bending, forming the interconnect terminal 108 into its final shape. In some instances, the interconnect terminal 108 may be plated prior to stamping. After the support bobbin 102 is wound and the conductive wire 104 is soldered to (or otherwise coupled) to the interconnect terminal 108, all or a portion of the interconnect terminal 108, solder, and conductive wire 104 under the solder may be protected from corrosion by covering it (or potions thereof) with an ultraviolet (UV) cured adhesive, Chemglaze® polyurethane (manufactured by the Lord Corporation, Erie, Pa.), fluoro-acrylate, or a similar coating that is not permeable to hydrogen sulfide. All or a portion of the interconnect terminal 108 may be protected from corrosion by covering it (or potions thereof) with an adhesive lined heat shrink tubing, an ultraviolet (UV) cured adhesive, Chemglaze® (manufactured by the Lord Corporation, Erie, Pa.), or a similar coating.

The interconnect terminal 108 may include a bendable or deformable arm 176 that is configured to be electrically coupled to the first end portion 114 of the insulated copper wire 104. It is contemplated that the arm 176 may be positioned generally orthogonal to the longitudinal axis of the support bobbin 102 (e.g., generally orthogonal to the interconnecting segment 130 or generally parallel to the second flange 128) when the interconnect terminal 108 is snap fit within the slot 146 of the second flange 128. In other words, to assemble the interconnect terminal 108 within the support bobbin 102, the arm 176 may be positioned generally parallel to the second flange 128. The interconnect terminal 108 may be positioned within the second slot 146 until the locking tab 174 to engages the aperture 150b. In some instances, the arm 176 may be bent beyond perpendicular in a direction away from the interconnecting segment 130 to ensure the conductive wire 104 does not catch on the interconnect terminal 108 during winding of the conductive wire 104 on the interconnecting segment 130. It is contemplated that the arm 176 may remain in this configuration while the copper wire 104 is being wound about the interconnecting segment 130.

Once winding of the conductive wire 104 is complete, the first end portion 114 of the conductive wire 104 may be wound about and/or soldered to (or otherwise electrically coupled with) an end region 175 of the arm 176. In some instances, the end region 175 may include one or more features 177 configured to direct or position the conductive wire 104. These features 177 may help ensure the first end portion 114 of the conductive wire 104 is located optimally for termination (e.g., placement of the first end portion 114 of the conductive wire 104) and folding down of the arm 176 after the conductive wire 104 has been wound. In some instances, the conductive wire 104 may be directed or placed along an underside surface 173 of the arm 176. Once the winding is complete and the first end portion 114 is coupled with the interconnect terminal 108, the arm 176 may be bent inward over the winding (as shown in FIGS. 4-6) such that it extends generally parallel to the longitudinal axis of the support bobbin 102 and towards the first flange 126. In some cases, bending of the arm 176 may not be required or the arm 176 may be bent in a direction other than inward.

As described above, as the quality of fuel gas decreases, gas supplies may include increasing concentrations of hydrogen sulfide. Some components within the electronic valve actuator 100 may be highly susceptible to corrosion from hydrogen sulfide gas, which reacts with copper to form copper sulfide, especially in the presence of moisture. In some cases, when the conductive wire 104 is formed from copper, the diameter of the conductive wire 104 may be significantly degraded or break due to the formation of copper sulfide.

Figure 11:
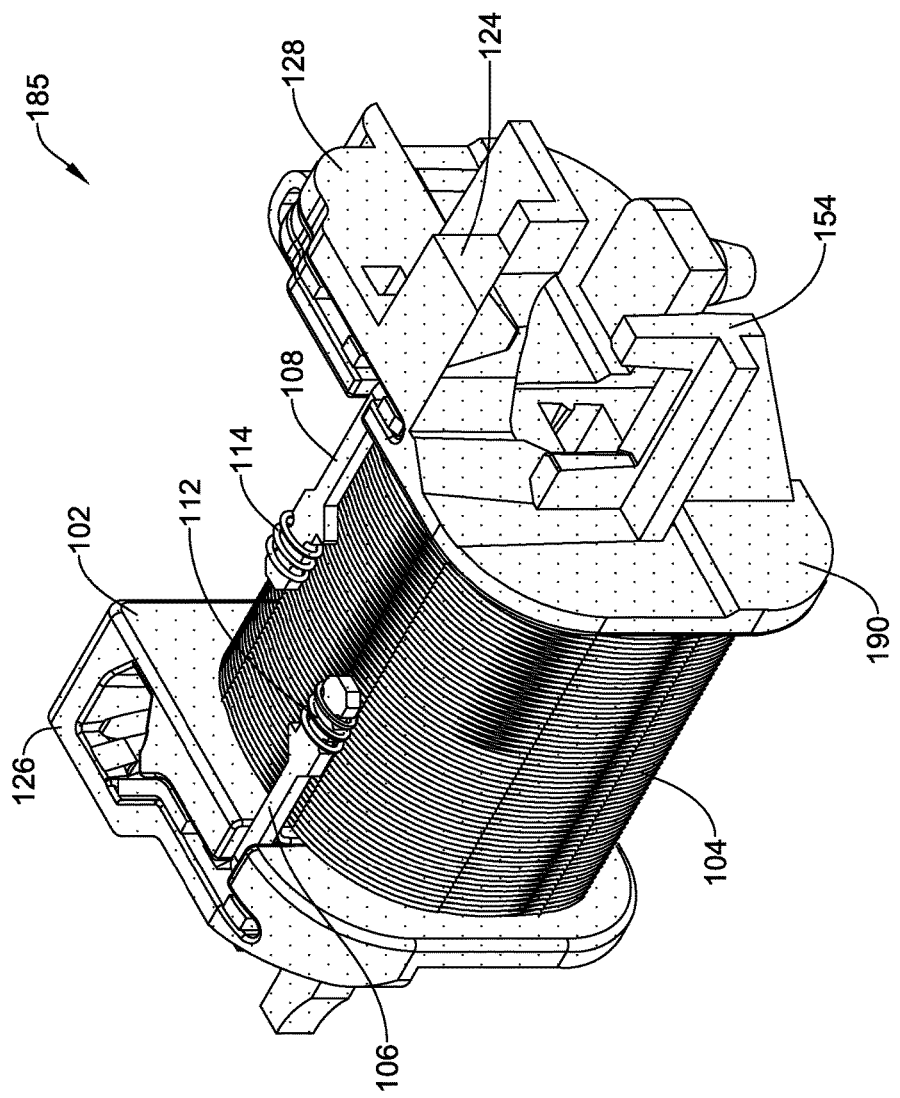
FIG. 11 is a perspective view of an illustrative wound bobbin assembly.

To help alleviate some of these concerns, after the ground and interconnect terminals 106, 108 are inserted into the bobbin support 102 and the copper wire 104 is wound on the bobbin 102 (e.g., about the interconnecting segment 130) and terminated to the terminals 106, 108, the entire wound bobbin assembly may be coated with a corrosion resistant encapsulant 190. FIG. 11 illustrates a perspective view of the illustrative wound bobbin assembly 185 including the anti-corrosion coating 190, indicated by the dot pattern. In some embodiments, the anti-corrosion coating may be of fluoro-acrylate material such as but not limited to Novec™ 2704 or Novec™ 2708 manufactured by the 3M™ Corporation, St. Paul, Minn. In other embodiments, the anticorrosion coating 190 may include polyurethane encapsulation or polyurea encapsulation. It is contemplated that polyurethane or polyurea encapsulants may be applied through a spray or brush process, a potting process, a dipping process and/or in any other suitable manner. It is contemplated that other encapsulants or coatings may be used that are resistant to hydrogen sulfide permeation. For example, the wound bobbin assembly 185, or portions thereof, may be overmolded in plastic.

In one illustrative embodiment, the wound bobbin assembly 185 is sprayed with 3M Novec™ 2704 or 2708 to coat the conductive wire 104 with a corrosion resistant encapsulant 190. The Novec™ material cures at room temperature in air within a few seconds and may leave about a 0.5 to 2 micron thick coating of fluoro-acrylate material 190 that has been found to be effective at preventing hydrogen sulfide corrosion. In other embodiments, the fluoro-acrylate material may be applied by a dipping process. Ultrasonic agitation in the dipping tank may be used to improve penetration of the coating into the winding and the overall uniformity of the coating. In some instances, spray coating may coat the entire wound bobbin assembly 185 with a thinner layer of material than dip coating. It is contemplated that other versions of Novec™ coating may also work. The 2700-series Novec™ coating has a UV tracer that may facilitate verification that the coating 190 has been appropriately applied.

The coating 190 may cover key functional areas of the wound bobbin assembly 185 including, but not limited to, the ground terminal pad 166 and the pivot point (e.g., second laterally extending portion 154) of the armature 118. The ground spring 144 may include sharp tips which are sufficient to penetrate the Novec™ coating and make the ground connection to the ground pad 166. The terminal ground pad 166 may then have the added benefit of the Novec™ coating 190 in addition to the tin-nickel plating to prevent corrosion.

In some embodiments, it may be advantageous to use a manufacturing process for the terminals 106, 108 in which the terminals 106, 108 are cut from stamping reels after the plating process. This may leave areas on each terminal 106, 108 that are not plated and subject to corrosion. Although the size of the terminals 106,108 may preclude corrosion to the point of failure over the life of the gas valve 10, it may not be desirable for them to corrode. The Novec™ coating may prevent corrosion of these areas on the terminals 106, 108 when appropriately applied.

In some embodiments, it may be desirable to bend the arm 162 of the ground terminal and the arm 176 of the interconnect terminal 108 before applying the anti-corrosion coating 190. In other embodiments it may be desirable to bend the arm 162 of the ground terminal 106 and the arm 176 of the interconnect terminal 108 after applying the anticorrosion coating 190. For example, if a UV cured adhesive or Chemglaze® is to be applied to the ends 163, 175 of the arms 162, 176 of the terminals 106, 108, the anticorrosion coating 190 may be applied to the wound bobbin assembly 185 prior to bending the arms 162, 176. The UV cured adhesive or Chemglaze® may then be applied to the ends 163, 175 and the arms 162, 176 subsequently bent by applying a bending pressure in an area away from the UV cured adhesive or Chemglaze®.

Alternatively, or additionally to the use of an anticorrosion coating 190, it is contemplated that the conductive wire 104 may be formed from a material other than copper that is not as susceptible to hydrogen sulfide corrosion. In one example, aluminum may be used to form the conductive wire 104. It is contemplated that aluminum may be less susceptible than copper to hydrogen sulfide corrosion. For example, exposed aluminum very quickly forms a layer of aluminum oxide which helps reduce the susceptibility of aluminum to hydrogen sulfide corrosion. While aluminum wire may be less expensive than copper wire it is also less conductive. As such the conductive wire 104 may need to form a bigger winding (if using aluminum) compared to copper to generate the same magnetic field with the same electrical power, or more electrical power would be required if the coil were the same size as a copper coil (e.g. more resistance).

In another example, nickel may be used to form the conductive wire 104, which is not susceptible to hydrogen sulfide corrosion. However, insulated nickel wire may be less conductive than either copper or aluminum and may be much more expensive. As such the conductive wire 104 may need to form a bigger winding (if using insulated nickel) compared to copper to generate the same magnetic field with the same electrical power, or more electrical power would be required if the coil were the same size as a copper coil.

Referring back to FIG. 10, the interconnect terminal 108 may include a second arm 178 that is configured to be electrically coupled to the interconnect pin 110 (see, for example, FIGS. 5-6) via a connecting wire. In some instances, the connecting wire may be an insulated nickel wire 111 (see, for example, FIGS. 5-6) extending between the second arm 178 of the interconnect terminal 108 and the interconnect pin 110. The second arm 178 of the interconnect terminal 108 may include features 179 configured to direct or position the insulated nickel wire 111. These features 179 may help ensure optimal location or positioning of the insulated nickel wire 111. The nickel wire 111 may help ensure that the wire 111 does not corrode in the presence of hydrogen sulfide. Thus, the wire 111 may be assembled with the interconnect terminal 108 after the application of an anticorrosion coating 190, if so provided. It is contemplated that the insulated nickel wire 111 may be short enough so that the increased resistance of the insulated nickel wire 111 (relative to copper) does not have a significant effect on the total resistance of the coil.

Figure 12:
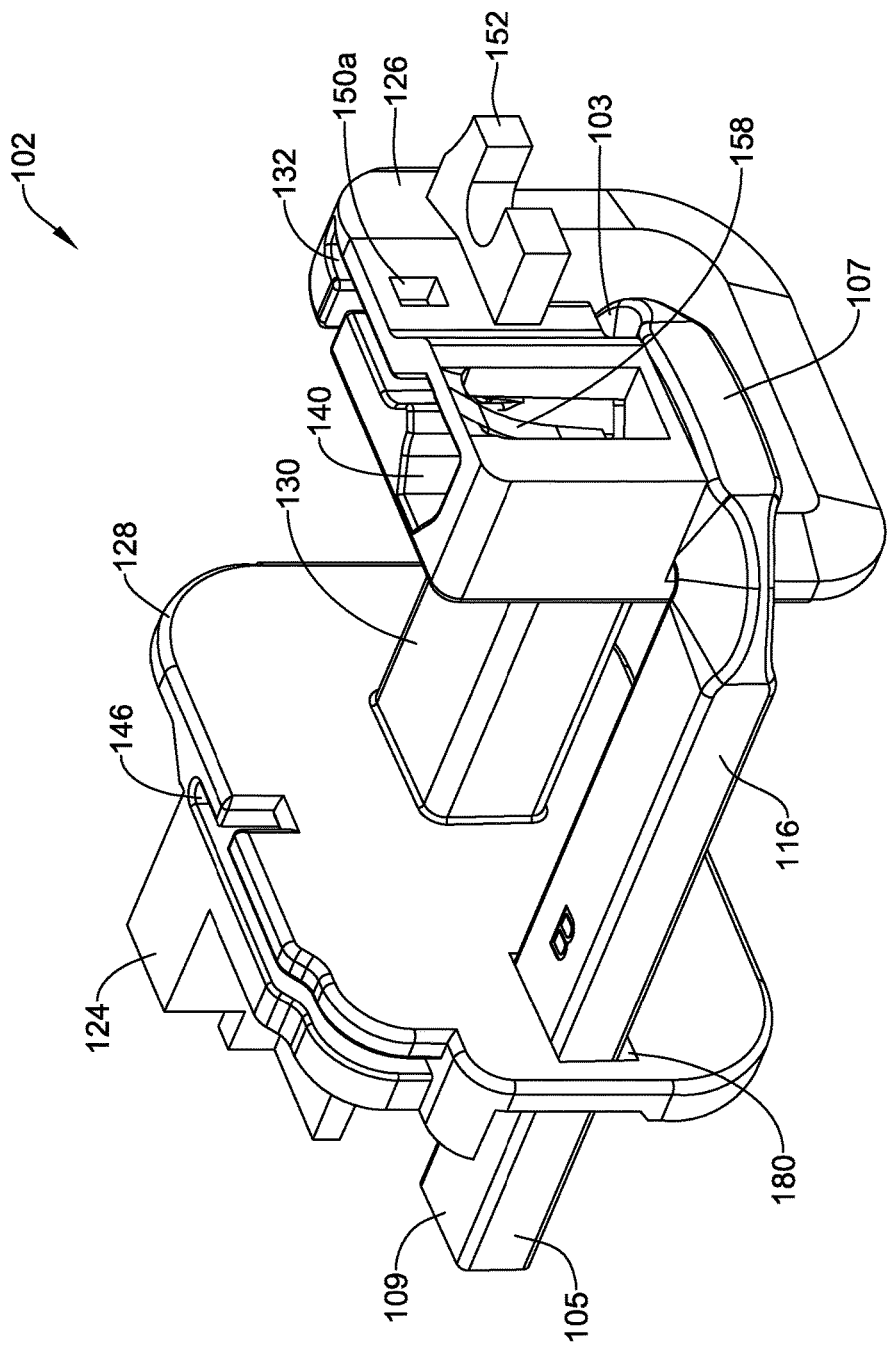
FIG. 12 is a rear perspective view of an illustrative support bobbin and magnetic flux concentration member.

FIG. 12 is a rear perspective view of the illustrative non-conductive support bobbin 102 and the magnetic flux concentration member 116. In the example shown, the magnetic flux concentration member 116 may be a generally U-shaped member having at least a first arm 103, a second arm 105, and a curved segment 107 connecting the first arm 103 and the second arm 105. The magnetic flux concentration member 116 may be formed of any material that when an electric current is passed through the insulated copper wire 104, the resulting magnetic flux is passed by magnetic flux concentration member 116. The magnetic flux concentration member 116 may be positioned such that the first arm 103 extends through the passageway 156 of the support bobbin 102. In some instances, the first arm 103 may be positioned under the armature 118, as can be seen in FIG. 5. The curved segment 107 may connect to the first arm 103 and the second arm 105 such that the second arm 105 is laterally spaced from the first arm 103. The second arm 105 may be positioned to be spaced a distance from the wound conductive wire 104 and extend alongside thereof. The second arm 105 may extend through an opening 180 in the second flange 128 such that an end 109 of the second arm 105 is positioned underneath a first end 119 of the armature 118 (see, for example, FIG. 5).

As an electrical current is passed through the conductive wire 104, a magnetic field may be generated by the coil in the magnetic flux concentration member 116. A magnetic attraction between the armature 118 and magnetic flux concentration member 116 may move the armature from the normally closed configuration is illustrated in FIG. 5 to an open configuration. A first end 119 of armature 118 may be attracted to and come into contact with the second arm 105, and an intermediate region 121 of the armature 118 may be attracted and come into contact with the first arm 103. This magnetic attraction may cause the armature 118 to overcome the biasing force of the spring 122 and lift the valve seal 120 away from the valve seat of the valve body 12. It is contemplated that when the armature 118 is in a closed configuration, the first end 119 of armature 118 may contact an underside of the first laterally extending portion 124 of the second flange 128, and when the armature is in an open configuration, the first end 119 may be spaced a distance from the underside of the first laterally extending portion 124.

The disclosure should not be considered limited to the particular examples described above, but rather should be understood to cover all aspects of the disclosure as set out in the attached claims. Various modifications, equivalent processes, as well as numerous structures to which the disclosure can be applicable will be readily apparent to those of skill in the art upon review of the instant specification.

What is claimed is:

1. A method for making a valve actuator for use in actuating a gas valve, the method comprising:
   winding an insulated copper wire around an interconnecting segment of a non-conductive support bobbin, with a ground terminal and an interconnect terminal being secured to the non-conductive support bobbin so as not to interfere with the winding of the insulated copper wire around the non-conductive support bobbin, wherein the non-conductive support bobbin includes a first flange, a second flange, and the interconnecting segment extending between and generally orthogonal to the first flange and the second flange, and wherein an arm of a magnetic flux concentration member extends through the interconnecting segment;

electrically connecting a first end portion of the insulated copper wire to the ground terminal;

electrically connecting a second end portion of the insulated copper wire to the interconnect terminal;

bending each of the ground terminal and the interconnect terminal inward over the wound insulated copper wire; and applying an anti-corrosion coating to at least the wound insulated copper wire, wherein the valve actuator comprises an armature that has a valve seal that is configured to align with a valve seat of the gas valve, the armature is configured to be actuated by magnetic attraction to the magnetic flux concentration member when a current is applied through the wound insulated copper wire via the interconnect terminal and the ground terminal.

2. The method of claim 1, wherein the anti-corrosion coating comprises a fluoro-acrylate coating, and wherein the fluoro-acrylate coating is applied by spraying.

3. The method of claim 1, wherein the anti-corrosion coating comprises a fluoro-acrylate coating, and wherein the fluoro-acrylate coating is applied by dipping the wound insulated copper wire into a fluoro-acrylate bath.

4. The method of claim 1, wherein the anti-corrosion coating comprises a fluoro-acrylate coating.

5. A valve actuator for use in actuating a gas valve, the valve actuator comprising:
a non-conductive support bobbin, the non-conductive support bobbin including a first flange, a second flange, and an interconnecting segment extending between and generally orthogonal to the first flange and the second flange;
a magnetic flux concentration member having at least a first arm, wherein the first arm extends through the interconnecting segment of the non-conductive support bobbin;
an insulated copper wire wound around the interconnecting segment of the non-conductive support bobbin;
an interconnect terminal electrically coupled to a first end portion of the insulated copper wire;
a ground terminal electrically coupled to a second end portion of the insulated copper wire;
an anti-corrosion coating disposed over at least the wound insulated copper wire; and
an armature that has a valve seal that is configured to aligned with a valve seat of the gas valve, the armature is actuated by magnetic attraction to the magnetic flux concentration member when a current is applied through the wound insulated copper wire via the interconnect terminal and the ground terminal.

6. The valve actuator of claim 5, wherein the anti-corrosion coating comprises a fluoro-acrylate.

7. The valve actuator of claim 5, wherein the anti-corrosion coating comprises an encapsulant.

8. The valve actuator of claim 5, wherein the ground terminal is disposed at least in part within a first slot in the first flange of the non-conductive support bobbin.

9. The valve actuator of claim 5, wherein the ground terminal is supported by the first flange and is bent inward toward the second flange and over at least part of the wound insulated copper wire.

10. The valve actuator of claim 9, wherein the ground terminal is electrically connected to a ground spring.

11. The valve actuator of claim 8, wherein the interconnect terminal is disposed at least in part within a second slot in the second flange of the non-conductive support bobbin.

12. The valve actuator of claim 5, wherein the interconnect terminal is supported by the second flange and is bent inward toward the first flange and over at least part of the wound insulated copper wire.

13. The valve actuator of claim 5, wherein the interconnect terminal is electrically connected to an interconnect pin via a connecting wire.

14. The valve actuator of claim 13, wherein the connecting wire is an insulated nickel or aluminum wire.

15. A valve actuator for use in actuating a gas valve, the valve actuator comprising:
a non-conductive support bobbin including:
a first flange;
a second flange spaced from the first flange; and
an interconnecting segment extending between the first flange and the second flange;
the non-conductive support bobbin defining a passageway that extends through the first flange, the second flange and the interconnecting segment;
a U-shaped magnetic flux concentration member including:
a first arm extending through the passageway of the non-conductive support bobbin and beyond an end of the passageway;
a second arm extending alongside the non-conductive support bobbin;
an insulated copper wire wound around the interconnecting segment of the non-conductive support bobbin;
an interconnect terminal electrically coupled to a first end portion of the insulated copper wire;
a ground terminal electrically coupled to a second end portion of the insulated copper wire;
a ground spring configured for electrically coupling the ground terminal to a conductive housing of the gas valve;
a fluoro-acrylate coating disposed over at least the wound insulated copper wire, the interconnect terminal, and the ground terminal; and
an armature that has a valve seal that is configured to align with a valve seat of the gas valve, the armature is actuated by magnetic attraction to one or more of the first arm and the second arm of the U-shaped magnetic flux concentration member when a current is applied to the wound insulated copper wire via the interconnect terminal and the ground terminal.

16. The valve actuator of claim 15, wherein at least part of the armature is biased via an armature spring away from one or more of the first arm and the second arm of the U-shaped magnetic flux concentration member.

17. The valve actuator of claim 15, wherein the ground spring extends through a spring aperture defined by the non-conductive support bobbin, wherein the spring aperture includes a biasing feature extending radially inward from an inner surface of the spring aperture, the biasing feature configured to bias at least part of the ground spring towards a side wall of the spring aperture.

18. The valve actuator of claim 15, wherein the interconnect terminal is electrically connected to an interconnect pin via a connecting wire, wherein the connecting wire is an insulated nickel or aluminum wire.

19. The valve actuator of claim 15, wherein the ground terminal is supported by the first flange and is bent inward toward the second flange and over at least part of the wound insulated copper wire, and wherein the interconnect terminal is supported by the second flange and is bent inward toward the first flange and over at least part of the wound insulated copper wire.

20. The valve actuator of claim 15, wherein the non-conductive support bobbin is made from a polymer.

\* \* \* \* \*